(12) United States Patent
Hille (10) Patent No.: US 9,715,822 B2
(45) Date of Patent: Jul. 25, 2017

(54) ELECTROMOTIVE FURNITURE DRIVE AND METHOD FOR CONTROLLING AN ELECTROMOTIVE FURNITURE DRIVE

(71) Applicant: DewertOkin GmbH, Kirchlengern (DE)

(72) Inventor: Armin Hille, Bielefeld (DE)

(73) Assignee: DEWERTOKIN GMBH, Kirchlengern (DE)

(\*) Notice: Subject to any disclaimer, the term of this patent is extended or adjusted under 35 U.S.C. 154(b) by 286 days.

(21) Appl. No.: 14/352,646

(22) PCT Filed: Oct. 18, 2012

(86) PCT No.: PCT/EP2012/070667
§ 371 (c)(1),
(2) Date: Apr. 17, 2014

(87) PCT Pub. No.: WO2013/057198
PCT Pub. Date: Apr. 25, 2013

(65) Prior Publication Data
US 2015/0123772 A1     May 7, 2015

(30) Foreign Application Priority Data
Oct. 18, 2011 (DE) .................... 20 2011 051 662 U (51) Int. Cl.
*G08C 17/02*     (2006.01)
*G06F 3/0482*     (2013.01)
(Continued)

(52) U.S. Cl.
CPC ............ *G08C 17/02* (2013.01); *A47C 20/041* (2013.01); *A47C 31/008* (2013.01); *G06F 3/0482* (2013.01); *G08C 2201/30* (2013.01)

(58) Field of Classification Search
None
See application file for complete search history.

(56) References Cited

U.S. PATENT DOCUMENTS 5,574,339 A \* 11/1996 Kattwinkel .......... A47C 21/006
    297/260.1
7,163,263 B1 \* 1/2007 Kurrasch ............. A47C 1/0242
    297/217.3
(Continued)

FOREIGN PATENT DOCUMENTS

| DE | 102005027671 | 12/2006 |
| DE | 102007016640 | 10/2008 |
| DE | 202009018060 | 2/2011 |

OTHER PUBLICATIONS

International Search Report issued by the European Patent Office in International Application PCT/EP2012/070667 on Dec. 21, 2012.

*Primary Examiner* — Quan-Zhen Wang
*Assistant Examiner* — Chico A Foxx
(74) *Attorney, Agent, or Firm* — Henry M. Feiereisen LLC (57) ABSTRACT

An electromotive furniture drive has a control device, a power-supply arrangement, a hand-held control connected to the control device via a bidirectional transmission path and having a connection configuration for at least one electrical motor client. The hand-held control has at least one display arrangement for displaying stored images for operation. The hand-held control has a detection device designed to detect the connection configuration.

13 Claims, 4 Drawing Sheets

(51) Int. Cl.
*A47C 20/04* (2006.01)
*A47C 31/00* (2006.01)

(56) References Cited

U.S. PATENT DOCUMENTS

| | | | |
|---|---|---|---|
| 7,735,918 B2* | 6/2010 | Beck | A47C 1/0242 297/217.3 |
| 8,596,716 B1* | 12/2013 | Caruso | A47C 31/126 297/217.1 |
| 8,636,320 B1* | 1/2014 | Caruso | A47C 7/022 297/217.3 |
| 9,247,828 B2* | 2/2016 | Cvek | A47C 31/00 |
| 9,295,338 B2* | 3/2016 | Rawls-Meehan | A47C 20/041 |
| 2003/0095211 A1 | 5/2003 | Nakajima | |
| 2003/0195644 A1 | 10/2003 | Borders et al. | |
| 2004/0108192 A1* | 6/2004 | Schneider | A47C 20/041 200/296 |
| 2005/0029980 A1* | 2/2005 | Bokamper | G05B 9/02 318/625 |
| 2007/0253149 A1 | 11/2007 | Mohn | |
| 2008/0092292 A1* | 4/2008 | Rawls-Meehan | A47C 20/041 5/600 |
| 2010/0176958 A1* | 7/2010 | Koch | G05B 19/042 340/635 |
| 2011/0037425 A1* | 2/2011 | Gehrke | G05B 23/0283 318/490 |
| 2011/0225734 A1* | 9/2011 | Huppe | G05B 9/03 5/616 |
| 2011/0231996 A1* | 9/2011 | Lemire | A61G 7/005 5/613 |
| 2011/0245979 A1* | 10/2011 | Koch | A47C 1/0242 700/275 |
| 2012/0194106 A1 | 8/2012 | Hille | |
| 2012/0194436 A1* | 8/2012 | Thodupunuri | A61B 5/1115 345/168 |
| 2012/0206070 A1 | 8/2012 | Hille | |
| 2013/0274902 A1* | 10/2013 | Langejurgen | H04L 12/40 700/84 |
| 2013/0289770 A1* | 10/2013 | Rawls-Meehan | G05B 15/02 700/275 |
| 2014/0159618 A1* | 6/2014 | Hille | H02P 29/00 318/15 |
| 2014/0303786 A1* | 10/2014 | Langejurgen | G05B 19/0426 700/275 |
| 2015/0025688 A1* | 1/2015 | Hille | A47C 20/041 700/275 |

\* cited by examiner

ELECTROMOTIVE FURNITURE DRIVE AND METHOD FOR CONTROLLING AN ELECTROMOTIVE FURNITURE DRIVE

CROSS-REFERENCES TO RELATED APPLICATIONS

This application is the U.S. National Stage of International Application No. PCT/EP2012/070667 filed Oct. 18, 2012, which designated the United States and has been published as international Publication No. WO 2013/057198 A1 and which claims priority of German Patent Application Ser. No. 20 2011 051 662.8, filed Oct. 18, 2011, pursuant to 35 USC 119(a)-(d).

BACKGROUND OF THE INVENTION

The invention relates to an electromotive furniture drive having a control device, a power supply apparatus, a handheld control, and having a terminal configuration having at least one electromotive consumer. Furthermore, the invention relates to a method for controlling an electromotive furniture drive.

Such electromotive furniture drives are known in various embodiments. They are implemented as linear drives having a linearly adjustable output element or as rotation drives having a rotating output element and have proven themselves very well in practice. The linear drives have one or a number of electric motors, wherein each motor has, connected downstream, a speed reducing gear and a further gear connected downstream from the speed reducing gear, for example, in the form of a threaded spindle gear, which generates a linear movement of the output element from the rotational movement of the motor. The rotational drives have at least one speed reducing gear connected downstream from the respective electric motor, wherein the last gearing element forms the output element. The output element of the respective electromotive furniture drive is connected to a fixed and/or a movable furniture component, so that during operation of the electric motor, the movable furniture components can be adjusted relative to one another. The furniture can be implemented as a slatted frame, worktable, bed, tabletop, treatment table, hospital or care bed, and also as a lifting device for persons, such as lifters or patient lifters.

It is routine to provide such electromotive furniture drives with a so-called network isolation switch, which more or less separates it from the electrical supply network when it is not in use. For operation of such a network isolation switch, a so-called auxiliary voltage source is necessary, which provides electrical energy for switching over or at least initiating switching over from a turned-off idle state into a turned-on operating state to trigger the switching signals.

Further consumers which are connectable to a control device of the electromotive furniture drive are, inter alia, massage drives, heaters, lights, etc. The handheld control can be implemented via a wired or wireless (radio/infrared) bidirectional transmission link. Bidirectional means that the handheld control not only can conduct control signals to the control device, but rather can also receive signals on the part of the control device, for example.

Handheld controls having a full graphic display screen (display apparatus) and having burned-in (hardware-technology) images are known. The full graphic display screen displays various images and functions to the consumer. Since not all functions can be imaged in the display screen for reasons of space, the images can be switched over. Thus, there is one image for an adjustment drive, another image for the massage drives, still another for the heater, etc. This switching over is also called turning pages and can be performed by pressing buttons, for example. The function of the respective consumer is controlled on the basis of the displayed image by means of other buttons.

Such electromotive furniture drives having handheld controls of the type described at the beginning have proven themselves very well in practice. However, the lack of flexibility and adaptation capability are to be considered disadvantageous, which relates to the image display and the symbol display of a display screen of the handheld control. In practice, numerous configurations of a furniture drive are used for small to moderate-sized production series of an item of furniture, wherein a different number of consumers, for example, a different number of adjustment drives and/or massage motors and/or heaters and/or lights, etc., can also be used in a small series of an item of furniture. Therefore, a corresponding adaptation of the handheld control or a corresponding configuration of the handheld control corresponding to the connected consumers must be performed for every series of an item of furniture, and also of the display capability thereof in the form of the images and symbols, which must be adapted by manual programming or hardware technology to the respective item of furniture having the respective electromotive furniture drive. This results in a high level of variant variety of the handheld control, which is very unfavorable logistically and with respect to the individual production and installation capability of each handheld control.

SUMMARY OF THE INVENTION

The invention is therefore based on the object of providing an improved electromotive furniture drive and an improved method for controlling the electromotive furniture drive.

According to one aspect of the invention, the object is achieved by an electromotive furniture drive having a control device, a power supply apparatus, a handheld control, which is coupled via a bidirectional transmission link to the control device, and a terminal configuration having at least one electromotive consumer, wherein the handheld control has at least one display apparatus for displaying stored images for operation, wherein the handheld control has an ascertainment apparatus, which is implemented to ascertain the terminal configuration.

According to another aspect of the invention, the object is additionally achieved by a method for controlling an electromotive furniture drive by a handheld control, wherein an ascertainment apparatus of the handheld control is activated, by which a terminal configuration of the electromotive furniture drive is ascertained, a configurator unit adapts the handheld control on the basis of the terminal configuration thus ascertained by generating releases for the images corresponding to the provided terminal configuration, wherein the images thus released are released for display on the display apparatus, and upon actuation of an operating element assigned to the images, a control command, which is also assigned to the image, is transmitted from the handheld control to the electromotive furniture drive.

The electromotive furniture drive has a handheld control having an ascertainment apparatus, which is implemented to ascertain the terminal configuration.

Furthermore, the electric motor furniture drive has a control device.

The term terminal configuration is to be understood to mean which type of consumer (adjustment motor, heater, massage drive, etc.) is connected to which terminal of a control device of the electric motor furniture drive.

In an alternative embodiment, the term terminal configuration is furthermore to be understood to mean which type of consumer (adjustment motor, heater, massage drive, etc.) is connected to the terminal intended for this purpose of a control device of the electric motor furniture drive.

A handheld control according to the application has at least one display apparatus for displaying stored images and operating elements, wherein the latter can be integrated as touch-sensitive operating elements in the display, which is then typically referred to as a touchscreen. The handheld control can especially be designed for operating the electromotive furniture drive. In the definition of the application, however, a mobile telephone, in particular a so-called smart phone, or the like also represents a handheld control, if this device has a program which establishes a communication link with the electromotive furniture drive, in order to exchange data, control commands, regulating commands, or items of status information.

In the furniture drive according to the invention, an adaptation of the handheld control, in particular the adaptation of the operation of the handheld control, to the terminal configuration of the respective electromotive furniture drive can be performed. It is thus made possible that in a handheld control, all possible images of terminal configurations are stored and only one handheld control is required for all possible combinations of consumers, which can be connected to the electromotive furniture drive. In the manner according to the invention, a handheld control for a variety of variants of an electromotive furniture drive is thus provided, which is implemented uniformly and is therefore to be produced so it is easily installable.

Accordingly, an electromotive furniture drive is provided having a control device, a power supply apparatus, a handheld control, which is coupled via a bidirectional transmission link to the control device, and having a terminal configuration having at least one electromotive consumer, wherein the handheld control has at least one display apparatus for displaying stored images for operation. The electromotive furniture drive is characterized in that the handheld control has an ascertainment apparatus, which is implemented to ascertain the terminal configuration.

A customer has a plurality of product configurations, but only in small piece counts. Some products, i.e., electromotive furniture drives, are equipped with heaters, others are in turn only equipped with massage units, and still others with adjustment drives, heater, and massage drives. Depending on how the item of furniture is constructed, the display apparatus of the handheld control adapts itself to the terminal configuration in a simple manner. The ascertainment apparatus establishes which type of consumer the electromotive furniture drive has. For example, if a massage unit is connected, the display apparatus must also display the image for this massage unit, or be able to display it.

In one embodiment, the ascertainment apparatus is manually and/or automatically activatable when a new item is put into operation, or after maintenance, replacement, or refitting of the electromotive furniture drive. The ascertainment apparatus conducts and guides the ascertainment of the terminal configuration from the handheld control and automatically adapts it to the respective terminal configuration.

In one embodiment, it is provided that the ascertainment apparatus is implemented to generate and display a menu guide for the manual ascertainment of the terminal configuration by a user on the display apparatus. The user can directly input the terminal configuration on the basis of the construction of the electromotive furniture drive.

Alternatively, the ascertainment apparatus can be implemented to read out data stored in the control device to ascertain the terminal configuration.

In a further embodiment, the ascertainment apparatus can be implemented for an automatic activation of all connected consumers. It only requires a starting pulse, which can be performed automatically or by the user by a button combination or actuation of a starting pulse button. The starting pulse button can be actuable in a first embodiment only using an auxiliary tool, for example, in the form of a ballpoint pen refill or another small tappet, since the button is arranged opposite to a relatively small opening, for example, having a clearance of up to 5 mm, of a wall. According to another embodiment, the starting pulse button is only actuable and arranged with difficult access, and is arranged, for example, on a consumer or on or in a control device or in parallel or in series, respectively, to a transmission link or behind a cover, wherein the cover is implemented as a battery cover or as a battery compartment closure or as a furniture part cover, for example. A starting pulse which is performed automatically is generated by a non-set memory cell, wherein the non-set state of the memory cell contradicts the use of the manual operation for the regular operation of the electromotive furniture drive. Another starting pulse which is automatically generated in another manner is generated by the application of the operating voltage to the handheld control, which is performed by putting the battery into operation, for example. In a further embodiment, a starting pulse can be generated controlled by software by the execution or the installation of a program. In one embodiment of the handheld control, the program is fed or incorporated therein with the installation thereof. Alternatively thereto, the program can subsequently be fed into the memory of the handheld control. If the program is installed or executed, the starting pulse is thus triggered. In one embodiment, a so-called app (application) can be provided as the program, which can be acquired from a higher-order storage location. A higher-order storage location can be localized in the Internet, for example, as a so-called app store or, equivalently, an app market, for example. Alternatively, a higher-order storage location can also be arranged within a local network, which is preferably implemented as a W-LAN network (wireless local area network).

In another embodiment, the handheld control furthermore comprises a storage apparatus, in which all images are stored, which are associated with possible terminal configurations of the electromotive furniture drive. The handheld control can thus be used universally.

In still a further embodiment, the handheld control can furthermore comprise a configurator unit, which is implemented for the release for the display on the display apparatus of images stored in the storage apparatus on the basis of the ascertained terminal configuration. Simple and efficient assignment and therefore adaptation is thus possible. The configurator unit can also be implemented as a storage register, a sequencing component, or as software, for example.

For this purpose, the configurator unit can be implemented to store the terminal configuration ascertained by the ascertainment apparatus in an assignment table.

In still a further embodiment, the control device can have a registration apparatus, which is connectable to the ascertainment apparatus to cooperate therewith. The connection can occur via the transmission link, which is implemented as wired or wireless as a radio link or infrared link.

In another embodiment, it is provided that the registration apparatus is connectable to a configuration storage apparatus, wherein the configuration storage apparatus is arranged in the control device and stores items of information about the terminal configuration. This embodiment can additionally also be used in combination with the other embodiments, for example, for redundancy or testing.

In still a further embodiment, the registration apparatus is coupled to a supply line of the power supply apparatus and is implemented to register current values of this supply line. Therefore, simple and rapid ascertainment of the terminal configuration may be executed automatically. Of course, it is also conceivable that this can be performed by the user, who performs the turning on and off of individual consumers or of consumer groups on the basis of a corresponding menu guide.

A method for controlling an electromotive furniture drive by a handheld control is characterized in that an ascertainment apparatus of the handheld control is activated, by which a terminal configuration of the electromotive furniture drive is ascertained. The handheld control is then adapted by a configurator unit on the basis of the terminal configuration thus ascertained, in that the configurator unit generates releases for the images corresponding to the provided terminal configuration, wherein the images thus released are released for display on the display apparatus. Upon actuation of an operating element assigned to an image, a control command also assigned to the image is transmitted from the handheld control to the electromotive furniture drive. In this manner, the handheld control adapts itself to the configuration of the electromotive furniture drive, whereby, on the one hand, the operability is simplified, since only actually provided functions of the electromotive furniture drive are shown and are available for selection by the user, and, on the other hand, the variety of models required in the handheld controls is decreased.

In one advantageous embodiment of the method, a menu guide is displayed on the display apparatus of the handheld control to ascertain the terminal configuration, on the basis of which the terminal configuration is input by actuating operating elements of the handheld control.

In a further advantageous embodiment of the method, a configuration storage apparatus, in which the terminal configuration is stored, of the control device is automatically read out to ascertain the terminal configuration.

In a further advantageous embodiment of the method, all consumers of the electromotive furniture drive are activated, i.e., turned on and off, to ascertain the terminal configuration, wherein simultaneously a registration of a current flow is performed by the registration apparatus, wherein a current associated with a consumer is registered. Depending on the registered current flow, the consumers which are activated are considered to be associated with the terminal configuration.

In a refinement of this embodiment, all consumers of the electromotive furniture drive are activated successively. For a short period of time, all terminals of the controller and therefore all terminal apparatuses of the control device are activated successively, as a result of which the respective terminal or the respective terminal apparatus has electrical power applied, and simultaneously the current flow registered by the registration apparatus is registered. In a further step, as described at the beginning, the handheld control is then adapted by the configurator unit. If no current flow of an activated terminal apparatus occurs, no consumer is also connected to this terminal apparatus.

A further embodiment of an electromotive furniture drive provides consumers implemented as an adjustment drive having integrated travel measuring system, wherein the travel measuring system has an absolute travel sensor or an incremental travel sensor. Absolute travel sensors can be potentiometers, for example, while magnet-sensitive or light-sensitive switches such as Hall sensors can be provided for incremental travel sensors. According to this special embodiment, the output of the travel measuring system or the signal preparation thereof has an electrical operative connection to the registration apparatus.

Another embodiment provides terminal apparatuses which have an operational connection with a switch contact. If a consumer can be connected by plugging to a terminal apparatus or attached thereto, the connection is accompanied by a mechanical action, which causes the switch contact to be switched in a contactless or, preferably, mechanically coupled manner. An electrical signal is then triggered and in a further step, as described at the beginning, the handheld control is then adapted by the configurator unit.

Another embodiment provides encodings, wherein each encoding is adapted for a predetermined type of consumer. For example, consumers implemented as adjustment drives have a different encoding than those of massage units or heaters, etc. The encodings can be designed in various ways, wherein the terminal plug of each consumer has a hardwired encoding, which is given by a predetermined pin allocation or by electrical components which can be analyzed, and which are electrically conductively connected to the pin allocation. Resistors, Zener diodes, capacitors, etc. come into consideration as electrical components which can be analyzed, wherein the type of the consumer is assigned to the characteristic parameter of the electrical component. Another type of the mentioned electrical component is formed by a storage component, which is implemented so it can be read out by means of software, and the memory contains the information about the type of the consumer. Accordingly, the registration apparatus is implemented to register information or to register the predetermined encoding, wherein the associated encoding is registered in the case of a consumer. The encoding is considered to be associated with the terminal configuration, the handheld control is then adapted by the configurator unit on the basis of the terminal configuration thus ascertained, in that the configurator unit generates releases for the images corresponding to the provided terminal configuration, wherein the images thus released are released for display on the display apparatus.

In a further embodiment of the method, the ascertainment apparatus can be activated to ascertain the terminal configuration automatically when a new item is put into operation, or after maintenance, replacement, or refitting, or by actuating one or more actuating elements on the handheld control or at another location, which are provided for this purpose, alone or in combination.

BRIEF DESCRIPTION OF THE DRAWING

Further characteristics and features result from the following description of the preferred exemplary embodiment and are the subject matter of further dependent claims.

The invention will be explained in greater detail on the basis of the appended drawings. In the figures.

DETAILED DESCRIPTION OF PREFERRED EMBODIMENTS

Figure 1:
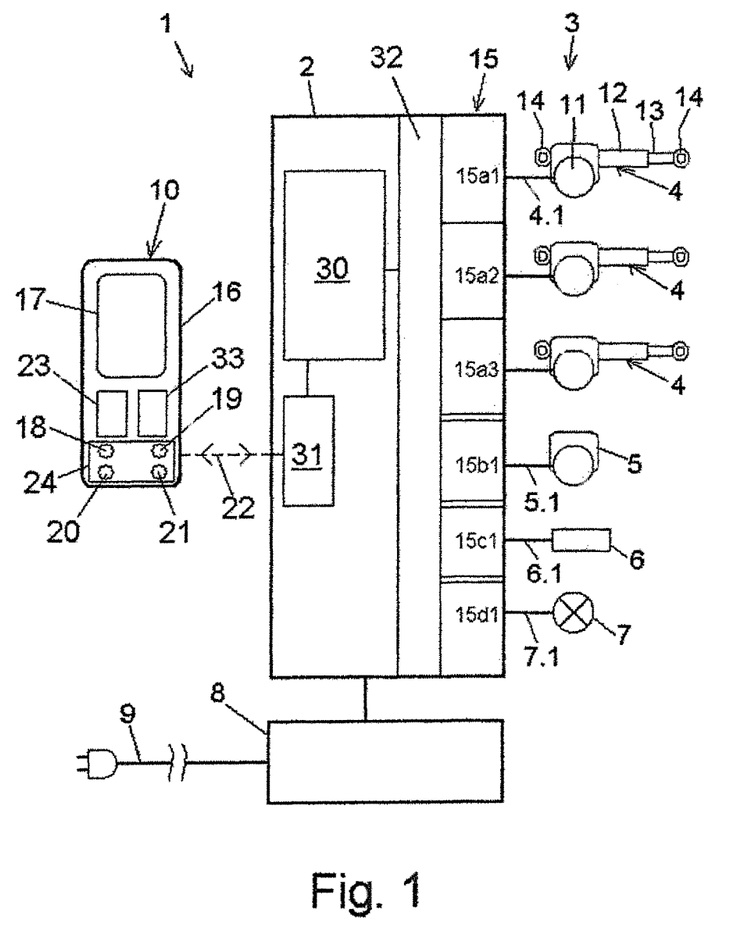
FIG. 1 shows a schematic block illustration of a first exemplary embodiment of a furniture drive according to the invention.
Figure 2:
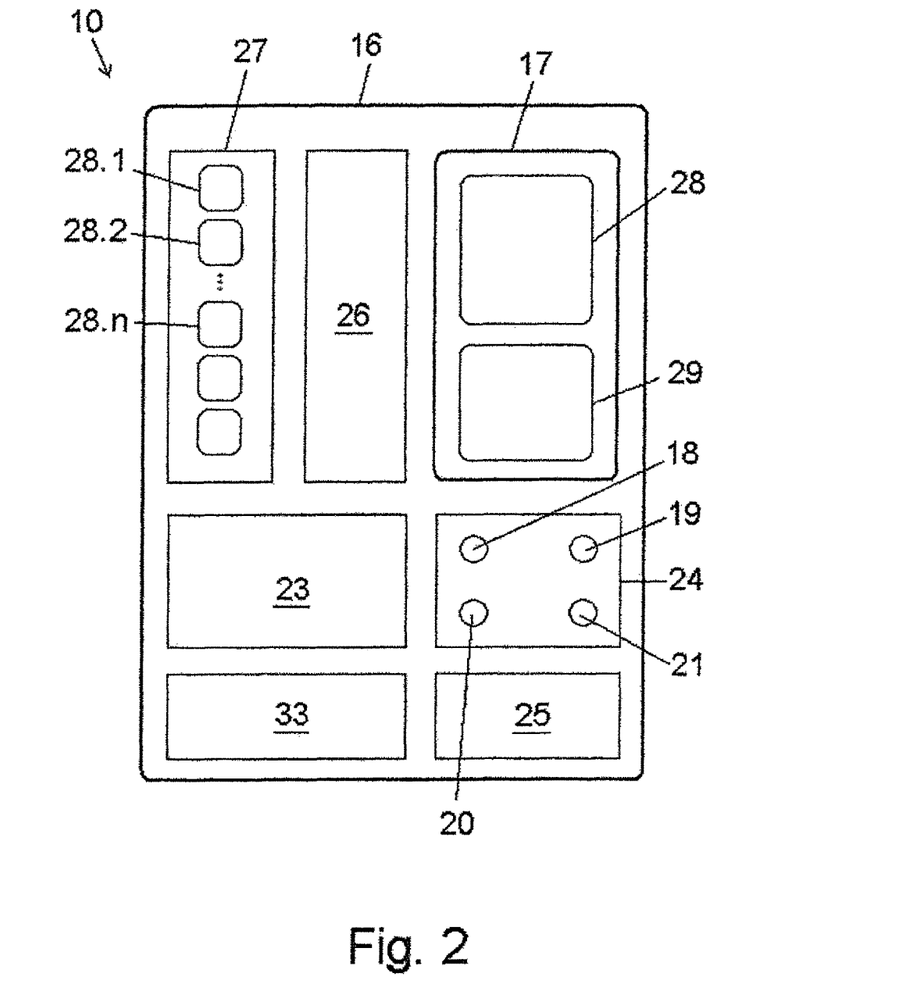
FIG. 2 shows an exemplary block diagram of a handheld control.

FIG. 1 shows a schematic block illustration of a first exemplary embodiment of a furniture drive 1 according to the invention. FIG. 2 shows an exemplary block diagram of a handheld control.

The electromotive furniture drive 1 comprises in this exemplary embodiment a control drive 2, three adjustment drives 4, implemented as linear drives, a massage drive 5, a heater 6, a light 7, a power supply apparatus 8, and a handheld control 10.

The three adjustment drives 4, the massage drive 5, the heater 6, and the light 7 are connected to the control device 2 as consumers in a defined terminal configuration 3 on a terminal apparatus 15. The terminal configuration 3 shown is only an example.

The terminal apparatus 15 has different terminal allocations, which are subdivided into the different consumers. Of course, more or fewer consumers than those shown can be provided.

The adjustment drives 4 are connected by means of motor lines 4.1 to motor terminals 15a1 . . . 3 on the terminal apparatus 15. A massage drive terminal 15b1 is connected to the massage drive 5 via a drive line 5.1. The heater 6 is connected using a heater line 6.1 to the terminal apparatus 15 at a heater terminal 15c1, and the light 7 is connected using a light line 71 to a light terminal 15d1 of the terminal apparatus 15.

The power supply apparatus 8 is implemented, for example, having an isolating transformer, rectifier, and filter circuit or as a switched power supply apparatus. According to the illustration in FIG. 1, it is connected via a network cable 9 to a network plug, wherein in another embodiment (not shown in greater detail), the network plug can be situated on a network isolation switch unit (also not shown). In another embodiment, this network isolation switch unit can be integrated in the power supply apparatus 8. It is also to be noted that the power supply apparatus 8 is then provided according to the illustration in FIG. 1 with an enclosing housing, so that the network plug can be attached or shaped on the housing.

An outlet of the power supply apparatus 8 is connected via a supply line to control device 2.

In a refining embodiment (not shown in greater detail, however), the power supply apparatus 8 is inserted in the housing of the control device 2 or one of the adjustment drives 4 or attached thereon, wherein one or two of the adjustment drives 4 can be constructed like a double drive in a manner not shown in greater detail, wherein at least one electric motor 11, but preferably two electric motors 11, are accommodated in a shared housing.

A construction of the adjustment drives 4 is indicated in greater detail on the above-described adjustment drive 4 having reference signs as a representative for the others. The adjustment drives 4 have a housing 12 and an extendable and retractable lifting pipe 13, depending on the rotational direction of an electric motor 11 (not shown in greater detail), on the free end of which a connection part in the form of a clevis 4 is attached. A further connection part in the form of a further clevis 4 is fastened on the housing 12 of the adjustment drive 4. The respective connection part is connected in a manner not shown in greater detail to one furniture component in each case, so that during operation of the electric motor 11, the furniture components respectively connected to the adjustment drive 4 move in relation to one another.

The massage drive 5 is also indicated as representative for multiple thereof and is used to drive various massage apparatuses (not shown) of an item of furniture, for example, of an easy chair. Using the heater 6, for example, seating surfaces, backrests, tabletops, etc. can be heated. One or more lights 7 can be used as reading lights, nightlights, or the like, for example.

The control device 2, which can also be referred to as a motor controller, can be implemented as a relay controller having relay switches and/or as a semiconductor circuit having semiconductor switches and is coupled to a handheld control 10 via a transmission link 22. The transmission link 22 can be embodied in wired form and/or wirelessly, for example, as a radio link or infrared link. In this exemplary embodiment, the transmission link 22 is implemented as a bidirectional transmission link 22.

The control device 2 has a consumer control apparatus 30, which, via a consumer switching unit 32, switches the consumers 4, 5, 6, 7 connected to the terminal apparatus 15 according to actuation of the handheld control 10. The consumer switching unit 32 has relay switches and/or semiconductor switches. Furthermore, the control device 2 is provided with a [word missing], which is connected to the handheld control 10 via the transmission link 22. The consumer transmission unit 31 is equipped for this purpose with a transceiver for the bidirectional transmission link 22.

By means of the handheld control 10, for example, the relay switches or the semiconductor switches can be turned on and off via control currents, for example, wherein the power switches of the relay switches or the semiconductor switches switch the high motor current of the respective consumer 4, 5, 6, 7.

The handheld control 10 comprises a handheld control housing 16, at least one display apparatus 17, an operating control apparatus 23, an operating unit 24 having display operating elements 18, 19 and switch operating elements 20, 21, and an ascertainment apparatus 33.

The at least one display apparatus 17, operating control apparatus 23, and operating unit 24 are arranged in the handheld control housing 16.

The at least one display apparatus 17 is a full graphic display screen and/or a display screen having pre-burned images. The consumers 4, 5, 6, 7 are graphically displayed with their functions in images 28 (see FIG. 2) on the display apparatus 17. If not all consumers having all functions can be displayed on the display apparatus 17 for reasons of space and clarity, the images 28 associated with a respective consumer can be switched over by means of the display operating elements 18, 19.

The images 28 are stored as individual images 28.1 . . . 28.n in a storage apparatus 27 of the handheld control 10.

Thus, for example, an image 28.1 having symbols for the adjustment drives 4, a further image 28.2 having symbols for massage functions of the massage drive 5, still a further image 28.3 having symbols for the operating state of the heater 6 with temperature specification, and still a further image 28.4 for the switching state of the light 7 can be displayed.

The respective functions, for example, adjustment of an adjustment drive 4 in one direction and in the opposite direction, or turning on/off the heater 6, are identified in the images 28 using relevant symbols and can be actuated using the switch operating elements 20, 21. The display operating elements 18, 19 and/or the switch operating elements 20, 21 can be implemented on the display apparatus 17 as touch switches (touchscreen switches) or can be separate switch elements, for example, membrane switches or electromechanical switches/buttons.

All images 28.1 . . . 28.$n$, which are associated with possible terminal configurations 3 of the electromotive furniture drive 1, are stored in the storage apparatus 27 of the handheld control 10. Depending on the terminal configuration 3, however, only those images 28, which correspond to the respective provided terminal configuration 3, can be made visible on the display apparatus 17, by so-called "page turning" by a user using the display operating elements 18, 19. In other words, the handheld control 10 automatically ascertains the terminal configuration 3 of the electromotive furniture drive 1, to which it is connected.

Furthermore, it can also be provided that the operator is informed about the completed actions. Handheld controls of the prior art have a snap-action contact, wherein the operator can recognize the completed input of the button command on the basis of the haptics. In the embodiment of a handheld control having a display screen, the operator is informed by an image displayed in the display screen. For this purpose, an image region can change in color or design, to display the command recognized by the control program to the operator. Alternatively thereto, an additional image can be displayed in the display screen, to display the command recognized by the control program to the operator. In addition, it is also conceivable that the program applies an acoustic signal or a haptically recognizable vibration signal to the respective output device of the handheld control. Such handheld controls can be implemented, as described at the beginning, as a mobile telephone, as a smart phone, as a tablet PC, or the like.

For this purpose, FIG. 2 shows an exemplary block diagram of the handheld control 10. It comprises the at least one display apparatus 17, the operating control apparatus 23, the operating unit 24 having display operating elements 18, 19 and switch operating elements 20, 21, a transmission unit 25, a configurator unit 26, the storage apparatus 27, and the ascertainment unit 33.

The operating control apparatus 23 is, for example, a microcomputer, which is connected to the at least one display apparatus 17, the operating unit 24, the transmission unit 25, the configurator unit 26, the storage apparatus 27, and the ascertainment unit 33.

The transmission unit 25 of the handheld control is equipped with a transceiver for the bidirectional transmission link 22, to communicate with the consumer transmission apparatus 31. Via this transmission link 22, control commands for the control of the electromotive furniture drive 1 are transmitted, and also items of information for ascertaining the terminal configuration 3.

The operating control apparatus 23 communicates by means of the transmission unit 25 with the consumer transmission apparatus 31 of the control device 2 and ascertains its terminal configuration 3, for example, when a new electromotive furniture drive 1 is put into operation, by means of activation of the ascertainment apparatus 33. This ascertainment will be described in greater detail hereafter. The ascertained terminal configuration 3 is stored in the configurator unit 26. The configurator unit 26 accordingly generates releases for the images 28.1 . . . 28.$n$ corresponding to the provided terminal configuration 3. For example, the storage apparatus 27 or the configurator unit 26 has an assignment table, in which by setting a release bit, the corresponding images 28.1 . . . 28.$n$ are released for access for display on the display apparatus 17.

In addition, additional items of information on the respective released images 28.1 . . . 28.$n$ can be displayed in one or also multiple additional images 29 by the configurator unit 26. These additional items of information can relate to the temperature of the heater 6, for example. Of course, many other items of information are also possible, which are important for the user.

The ascertainment of the terminal configuration 3 can be performed in this first exemplary embodiment according to FIG. 1 by a menu guide on the display apparatus 17 of the handheld control 10, which is executed by the ascertainment apparatus 33. Controlled by the ascertainment apparatus 33 and/or the operating control apparatus 23, the display apparatus 17 displays, for example, as an additional image 29, questions to the user when a new item is put into operation, which the user answers by simply pressing operating elements 18, 19, 20, 21 of the operating unit. Thus, the ascertainment apparatus 23 ascertains the terminal configuration 3 and transmits it to the configurator unit 26 for the assignment table. The ascertainment apparatus 33 can also be, for example, a component of the operating control apparatus 23, for example, a program part.

Figure 3:
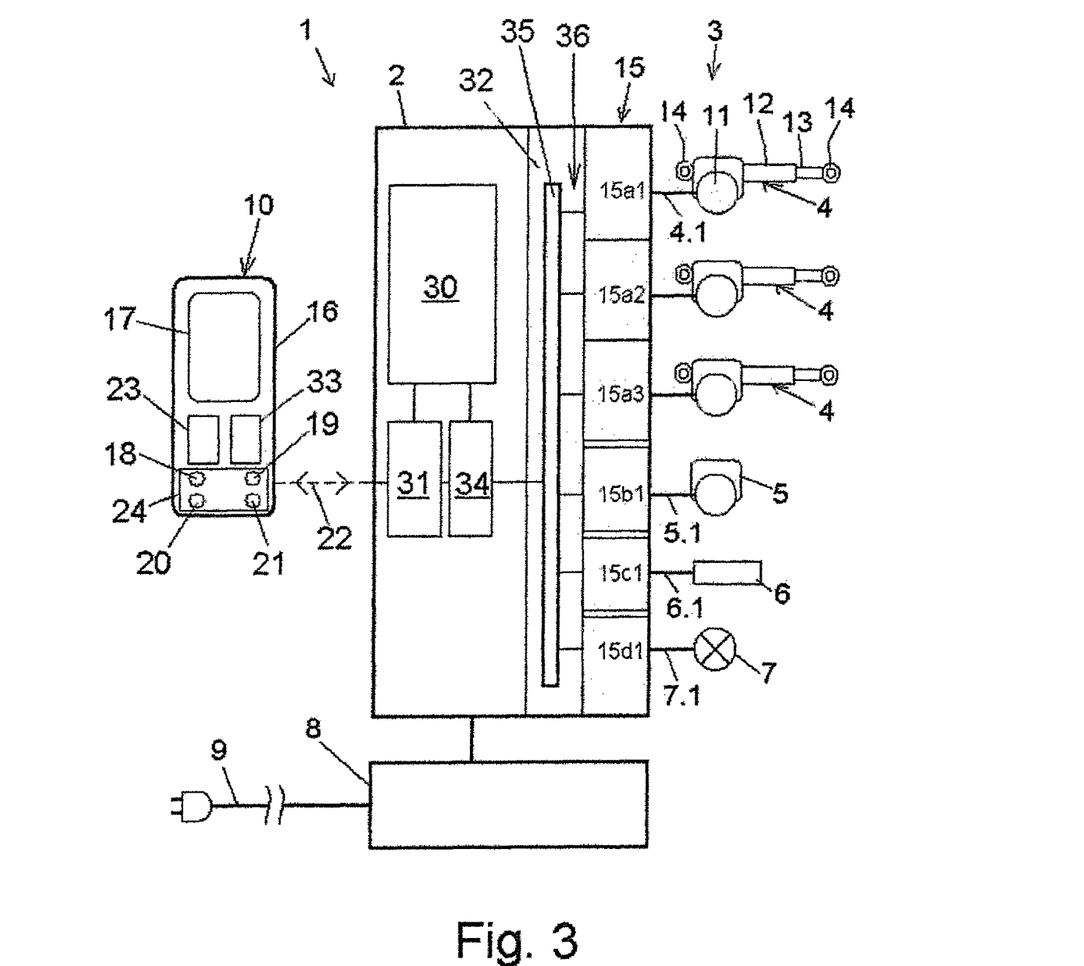
FIG. 3 shows a schematic block illustration of a second exemplary embodiment of the furniture drive according to the invention.

FIG. 3 shows a schematic block illustration of a second exemplary embodiment of the furniture drive 1 according to the invention.

In this second exemplary embodiment, the control device 2 is provided with a registration apparatus 34 and a configuration storage apparatus 35.

The registration apparatus 34 is connected to the consumer control apparatus 30, the consumer transmission apparatus 31, and the configuration storage apparatus 35.

The configuration storage apparatus 35 has an assignment of the terminals 15*a* . . . 15*d* of the terminal apparatus 15 to the consumers. Such an assignment and storage can be implemented in various ways.

For this purpose, connecting strokes are indicated in FIG. 3 using the reference signs 36 as configuration reporting elements. These can be embodied as follows.

In one variant of the second exemplary embodiment, each terminal has an electromechanical contact (for example, by a pin or magnet on the plug connector of a consumer), which is turned on or off when a consumer is connected to the respective terminal. This can also be embodied as a multipolar plug having binary encoding.

In another variant, each plug or consumer has an electrical encoding, for example, a resistor, a capacitor, an RC circuit, an LC circuit, an RFID chip, or the like, which is recognized by the configuration storage apparatus 35 and assigned to the respective terminal.

In still another variant, the configuration storage apparatus 35 can be an assembly of switches (DIP switches, DIP arrays, inter alia), which is set in accordance with the respective terminal configuration 3 during the configuration of the electric motor furniture drive 1.

The registration apparatus 34 is designed such that it is activated by the ascertainment apparatus 33 to ascertain the terminal configuration 3 via the consumer transmission apparatus 31 and reads out the terminal configuration 3 stored by the configuration storage apparatus 35, prepares it in signal technology, and transmits it to the ascertainment apparatus 33 in a manner controlled by the operating control apparatus 23.

This can be performed in that all consumers are turned on simultaneously and for a short period of time. Alternatively, the consumers are turned on individually and in a predetermined sequence for a short period of time. In one embodiment, the registration apparatus 34 registers the character of the current profile within this period of time and classifies the consumer. Typical consumers have a two-core connection line, wherein the terminal plug of the consumer is also bipolar. Other terminal plugs have further terminals, wherein an above-mentioned encoding is connected to further terminals. The encoding can be implemented as an RC, LC, R element or a binary wiring. The item of information, for example, in which span an electrical resistor connected to the further terminal is arranged, is compared to a table entry of the program, wherein the registration apparatus ascertains the level of the exemplary resistance value. The above-mentioned period of time can typically be up to half a second.

The connection of the registration apparatus 34 to the consumer control apparatus 30 can be used to turn on and off a consumer for additional verification of a connection via the consumer control apparatus 30, if necessary. In other words, to perform a check of the terminal configuration 3 stored in the configuration storage apparatus 35, if this is requested by the ascertainment apparatus 33.

Figure 4:
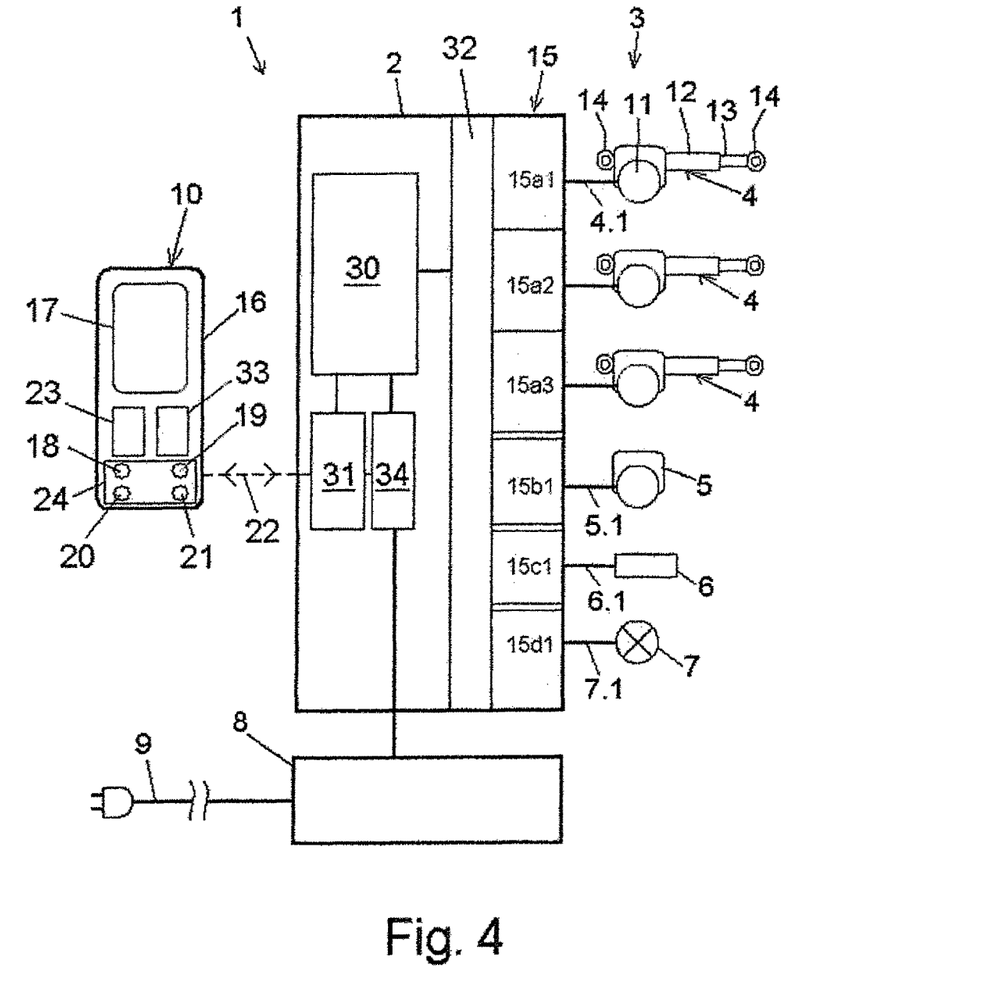
FIG. 4 shows a schematic block illustration of a third exemplary embodiment of the furniture drive according to the invention.

FIG. 4 shows a schematic block illustration of a third exemplary embodiment of the furniture drive 1 according to the invention.

In contrast to the second exemplary embodiment, no configuration storage apparatus 35 is provided here. The registration apparatus 34 is connected to a current supply line from the power supply apparatus 8 for the consumers, which conducts electrical supply power to the consumer control apparatus 30. The registration apparatus 34 is implemented here having a current measuring unit (not shown in greater detail). If the registration apparatus 34 is activated by the ascertainment apparatus 33 to ascertain the terminal configuration 3, the ascertainment apparatus 33 thus briefly switches all terminals of the terminal apparatus 15 on and off successively via the consumer control apparatus 30 and ascertains in each case by means of the registration apparatus 34 whether a current flows from the power supply apparatus 8 to the respective turned-on terminal of the terminal apparatus 15. If a consumer is connected to the respective turned-on terminal of the terminal apparatus 15, a corresponding current flows, which measurably differs from the supply current for the consumer control apparatus 30 and the respective turned-on switch element. In this manner, all terminals are successively processed and the terminal configuration 3 is ascertained by the ascertainment apparatus 33 and stored as described above.

The ascertainment of the terminal configuration 3 of the electric motor furniture drive 1 and adaptation of the handheld control 10 can be performed as follows.

When a new item is put into operation, or after maintenance, replacement, or refitting, a start of the ascertainment apparatus 33 is performed for the ascertainment, automatically or by actuating one or more actuating elements, which are provided for this purpose, alone or in combination.

This can be performed in the first exemplary embodiment according to FIG. 1 by menu guide on the display apparatus 17 of the handheld control 10, in that displayed questions are answered by actuating operating elements 18, 19, 20, 21 of the operating unit.

To ascertain the terminal configuration 3, the ascertainment apparatus 33 activates the registration apparatus 34 in the control device 2 in the second and third exemplary embodiments via the transmission link 22 having the associated transmission units/apparatuses 25, 31.

For this purpose, a configuration storage apparatus 35 is read out in the second exemplary embodiment, in which the terminal configuration 3 is stored.

In the third exemplary embodiment, all terminals of the terminal apparatus 15 are activated, i.e., turned on and off, for this purpose by the ascertainment apparatus 33 in the handheld control 10, wherein a registration of a current flow is performed simultaneously by the registration apparatus 34. If a current associated with a consumer is registered, the activated terminal is considered to be connected to the associated consumer.

The terminal configuration 3 thus ascertained is stored in the configurator unit 26. The configurator unit 26 accordingly generates releases for the images 28.1 ... 28.$n$ corresponding to the provided terminal configuration 3. These images 28.1 ... 28.$n$, which are associated with the ascertain terminal configuration 3, are therefore released for access for display on the display apparatus 17.

The above-described exemplary embodiments do not restrict the invention. It is modifiable in the scope of the appended claims.

It is thus conceivable that the configurator unit 26 is a component of the operating control apparatus 23 or the ascertainment apparatus 33.

In the case of a menu-guided manual input or ascertainment of the terminal configuration 3, two of the operating elements 18, 19, 20, 21 can be used as a so-called two-handed operation, in order to start the ascertainment.

It is also possible that the display apparatus displays, controlled by the ascertainment apparatus 33, for example, as an additional image 29, to the user when a new item is put into operation, which individual consumers he should turn on and off briefly as instructed.

An ascertainment can also be initiated by a so-called ballpoint pen button on the handheld control and/or a start button at another location, for example, also after maintenance or replacement or refitting of consumers.

The power supply apparatus 8 can be provided with an auxiliary power source, which can be a battery, an accumulator, and/or a capacitor, for example. An emergency lowering function is therefore also possible. It is also possible that the power supply apparatus 8 is a battery and/or an accumulator.

What is claimed is:

1. An electromotive furniture drive of a furniture, comprising:
    a control device comprising a consumer transmission apparatus and a registration apparatus;
    a terminal configuration having a plurality of electromotive consumers including of a type that performs adjustments and a type that performs massage functions respectively for the furniture;
    a handheld control having an operating control apparatus, at least one display apparatus for displaying stored images of the plurality of electromotive consumers with their respective functions and an ascertainment apparatus configured to ascertain the terminal configuration and to display it on the at least one display apparatus which also displays the stored images of the plurality of electromotive consumers with their respective functions; and wherein the consumer transmission apparatus facilitates a bidirectional transmission link coupling the handheld control to the control device, and the terminal configuration is ascertained by the ascertainment apparatus activating the registration apparatus to read out information about the terminal configuration which is provided to the ascertainment apparatus via the consumer transmission apparatus in a manner controlled by the operating control apparatus; and wherein the handheld control and the at least one display apparatus are configured to display on the at least one display apparatus the stored images of the plurality of electromotive consumers with their respective functions including symbols of adjustment drives, symbols for massage functions, and symbols for an operating state of an extendable and retractable lifting pipe corresponding to an adjustment of the furniture, wherein the displayed symbols respectively correspond to the type of electromotive consumer that performs adjustments or the type that performs massage functions, which displayed symbols permit a user of the furniture to provide control operations for that type of electromotive consumer.

2. The electromotive furniture of claim 1, wherein the ascertainment apparatus is activated in a manner selected from a group consisting of manually or automatically, when a new electromotive consumer is put into operation, or after maintenance, replacement or refitting of the electromotive furniture drive.

3. The electromotive furniture drive of claim 1, wherein the ascertainment apparatus is configured to generate and display a menu guide for manual ascertainment of the terminal configuration by a user on the display apparatus.

4. The electromotive furniture drive of claim 1, wherein the ascertainment apparatus is configured to automatically activate all of the plurality of electromotive consumers.

5. The electromotive furniture drive of claim 1, wherein the handheld control includes a storage apparatus which stores all images associated with possible terminal configurations of the electromotive furniture drive.

6. The electromotive furniture drive of claim 1, wherein the handheld control includes a configuration unit configured to release images stored in the storage apparatus for display on the at least one display apparatus on the basis of the ascertained terminal configuration.

7. The electromotive furniture drive of claim 1, further comprising a configuration storage apparatus arranged in the control device and configured to store the information about the terminal configuration, said registration apparatus being connectable to the configuration storage apparatus to read the information about the terminal configuration.

8. The electromotive furniture drive of claim 1, further comprising a power supply apparatus, said registration apparatus being coupled to a supply line of the supply apparatus and configured to register current values of the supply line to read the information about the terminal configuration.

9. A method for controlling an electromotive furniture drive for a furniture, by a handheld control comprising an operating control apparatus and a display apparatus, said method comprising:

activating an ascertaining apparatus of the handheld control to ascertain a terminal configuration of the electromotive furniture drive by activating a registration apparatus of a control device of the electromotive furniture drive to read out information about the terminal configuration which is provided to the ascertainment apparatus via a transmission of a consumer transmission apparatus coupling the control device and the handheld control in a manner controlled by the operating control apparatus, the terminal configuration having a plurality of electromotive consumers including of a type that performs adjustments and a type that performs massage functions respectively for the furniture;

adapting to generate, by a configurator unit of the handheld control on the basis of the ascertained terminal configuration, releases of stored images of the plurality of electromotive consumers with their respective functions corresponding to the terminal configuration;

releasing the thus released images of the plurality of electromotive consumers with their respective functions and the terminal configuration for display on the display apparatus, the images of the plurality of electromotive consumers with their respective functions including symbols of adjustment drives, symbols for massage functions, and symbols for an operating state of an extendable and retractable lifting pipe corresponding to an adjustment of the furniture, wherein the displayed symbols respectively correspond to the type of electromotive consumer that performs adjustments or the type that performs massage functions, which displayed symbols permit a user of the furniture to provide control operations for that type of electromotive consumer via an operating unit of the handheld control that comprises operating elements respectively assigned to the images that are displayed corresponding to the type of electromotive consumer of the plurality of electromotive consumers that is displayed; and upon actuation of an operating element of the operating unit assigned to an image of the images of a displayed type of electromotive consumer, transmitting a control command to provide the control operations corresponding to the assigned image, from the handheld control to the electromotive furniture drive to control the displayed electromotive consumer.

10. The method of claim 9, further comprising, for ascertaining the terminal configuration, displaying a menu guide on the display apparatus of the handheld control, on the basis of which the terminal configuration is input by actuating the operating elements of the handheld control.

11. The method of claim 9, further comprising, to ascertain the terminal configuration, automatically reading out by the ascertainment apparatus a configuration storage apparatus of a control device of a control device of the electromotive furniture drive in which the terminal configuration is stored.

12. The method of claim 9, further comprising, to ascertain the terminal configuration, activating the plurality of electromotive consumer by the ascertaining apparatus, by turning on and off all of the plurality of electromotive consumers of the electromotive furniture drive, and simultaneously performing a registration of a current flow by the registration apparatus, and in the event a current associated with a consumer of said plurality of electromotive consumers is registered, considering said activated consumer to be associated with the terminal configuration depending on the registered current flow.

13. The method of claim 9, further comprising activating the ascertainment apparatus to ascertain the terminal configuration when a new electromotive consumer is put into operation, after maintenance, replacement, or refitting, or after installation of a program or after a start of a program on the handheld control automatically or by actuating one or more of the actuating elements on the handheld control or at another location of the handheld control provided for this purpose, alone or in combination.

* * * * *